(12) United States Patent
Sakaki et al.

(10) Patent No.: US 9,193,806 B2
(45) Date of Patent: Nov. 24, 2015

(54) METHOD FOR PRODUCING AN EPOXIDIZED NATURAL RUBBER, RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventors: Toshiaki Sakaki, Kobe (JP); Lucksanaporn Tarachiwin, Rayong (TH); Kamolchat Charungchitaree, Rayong (TH); Hathainat Kum-Ourm, Rayong (TH)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/368,592

(22) PCT Filed: Jan. 22, 2013

(86) PCT No.: PCT/JP2013/051208
§ 371 (c)(1),
(2) Date: Jun. 25, 2014

(87) PCT Pub. No.: WO2013/111753
PCT Pub. Date: Aug. 1, 2013

(65) Prior Publication Data
US 2014/0378619 A1   Dec. 25, 2014

(30) Foreign Application Priority Data

Jan. 23, 2012  (JP) ................................ 2012-011407
Mar. 2, 2012   (JP) ................................ 2012-046879
Sep. 26, 2012  (JP) ................................ 2012-212685

(51) Int. Cl.
*C08C 1/14*    (2006.01)
*C08C 19/06*   (2006.01)
*B60C 1/00*    (2006.01)
*C08L 15/00*   (2006.01)

(52) U.S. Cl.
CPC .  *C08C 19/06* (2013.01); *B60C 1/00* (2013.01); *B60C 1/0016* (2013.04); *C08C 1/14* (2013.01); *C08L 15/00* (2013.01)

(58) Field of Classification Search
USPC ....................................... 525/333.1; 528/936
See application file for complete search history.

(56) References Cited

U.S. PATENT DOCUMENTS

2003/0190490 A1    10/2003  Kaya et al.
2006/0016716 A1*    1/2006  Fregonese et al. ............ 524/493
2010/0130663 A1*    5/2010  Taguchi et al. ............... 524/432

FOREIGN PATENT DOCUMENTS

| JP | 2000-44708 A  | 2/2000  |
| JP | 2002-338603 A | 11/2002 |
| JP | 2003-292658 A | 10/2003 |
| JP | 2006-213751 A | 8/2006  |
| JP | 2009-293011 A | 12/2009 |

OTHER PUBLICATIONS

International Search Report issued in PCT/JP2013/051208, mailed on Apr. 2, 2013.
Full Machine Translation for Japanese Publication No. 2000-44708-A, dated Feb. 15, 2000.
Full Machine Translation for Japanese Publication No. 2002-338603-A, dated Nov. 27, 2002.
Full Machine Translation for Japanese Publication No. 2006-213751-A, dated Aug. 17, 2006.
Full Machine Translation for Japanese Publication No, 2009-293011-A, dated Dec. 17, 2009.

* cited by examiner

*Primary Examiner* — Fred M Teskin
(74) *Attorney, Agent, or Firm* — Birch Stewart Kolasch & Birch, LLP

(57) ABSTRACT

Provided are a method for producing a relatively uniformly epoxidized natural rubber in a simple and inexpensive manner, a rubber composition for tires that includes the epoxidized natural rubber, and a pneumatic tire formed from the rubber composition for tires. The present invention relates to a method for producing an epoxidized natural rubber, including: Step 1 of coagulating natural rubber latex into granules to prepare a granular solid rubber; and Step 2 of treating the granular solid rubber with an epoxidizing liquid to epoxidize the granular solid rubber.

12 Claims, No Drawings

METHOD FOR PRODUCING AN EPOXIDIZED NATURAL RUBBER, RUBBER COMPOSITION FOR TIRES, AND PNEUMATIC TIRE

TECHNICAL FIELD

The present invention relates to a method for producing an epoxidized natural rubber, and also relates to a rubber composition for tires and, a pneumatic tire, each including an epoxidized natural rubber produced by the method.

BACKGROUND ART

Conventional rubber products such as tires contain epoxidized natural rubber. Typical epoxidized natural rubber is produced through a series of steps of: concentrating field latex collected from rubber trees (e.g. *Hevea brasiliensis*) by centrifugation; adding a surfactant to the resulting concentrated latex and subsequently adding formic acid while stirring; slowly introducing hydrogen peroxide over several hours and then allowing the epoxidation reaction to proceed for about one day; coagulating the resulting epoxidized natural rubber in latex form; and optionally neutralizing, water washing, and drying the coagulated natural rubber latex.

The series of production steps advantageously allow uniform epoxidation of rubber because the rubber is epoxidized while having the same particle size (0.1 to several μm) as when it is present in latex. Unfortunately, however, the production cost of epoxidized natural rubber is very high due to the long reaction time, the use of expensive chemical agents, the large number of steps, and the like. Moreover, the rubber is destabilized such that it can easily coagulate; therefore, a surfactant needs to be added, which increases the cost and also creates other problems: for example, a reduction in the rubber physical properties of a final rubber product due to the absorption of moisture caused by the surfactant remaining in the product; and difficulties in controlling the temperature during the epoxidation reaction, which require the operator to continuously monitor the reaction.

Meanwhile, Patent Literature 1 discloses a method for producing an epoxidized natural rubber latex by mixing natural rubber latex with peracetic acid prepared from hydrogen peroxide and acetic acid and/or acetic anhydride. This method allows a rapid and quantitative chemical reaction, so that a desired degree of epoxidation can be rapidly achieved. In this method, however, since the reaction between hydrogen peroxide and acetic acid and/or acetic anhydride is in equilibrium, excess amounts of acetic acid and hydrogen peroxide are required to obtain a necessary amount of peracetic acid. Thus, the method has problems that, for example, it needs excessive amounts of expensive chemical agents, as well as an extra cost for treating wastewater containing the excessive chemical agents.

CITATION LIST

Patent Literature

Patent Literature 1: JP 2009-293011 A

SUMMARY OF INVENTION

Technical Problem

The present invention aims to solve the aforementioned problems by providing a method for producing a relatively uniformly epoxidized natural rubber in a simple and inexpensive manner, as well as a rubber composition for tires that includes the epoxidized natural rubber, and a pneumatic tire formed from the rubber composition for tires.

Solution to Problem

The present invention relates to a method for producing an epoxidized natural rubber, including: Step 1 of coagulating natural rubber latex into granules to prepare a granular solid rubber; and Step 2 of treating the granular solid rubber with an epoxidizing liquid to epoxidize the granular solid rubber.

The epoxidizing liquid is preferably at least one of a peracetic acid-containing liquid and a performic acid-containing liquid. The peracetic acid-containing liquid is preferably obtained by mixing at least one of acetic acid and acetic anhydride with hydrogen peroxide and reacting them. The performic acid-containing liquid is preferably obtained by mixing formic acid with hydrogen peroxide and reacting them.

The natural rubber latex is preferably at least one selected from the group consisting of field latex, concentrated latex obtained by concentrating field latex, and modified natural rubber latex obtained by removing non-rubber components from the foregoing.

Step 1 preferably includes coagulating the natural rubber latex into granules with the aid of an acid to prepare the granular solid rubber, and more preferably includes coagulating the natural rubber latex into granules with the aid of an acid and a flocculant to prepare the granular solid rubber.

The granular solid rubber preferably has a particle size of not more than 20 mm, and more preferably has a particle size of not more than 12 mm.

The present invention relates to an epoxidized natural rubber, produced by the aforementioned method.

The epoxidized natural rubber preferably has a degree of epoxidation of 0.1 to 50%.

The present invention relates to a rubber composition for tires, including the epoxidized natural rubber.

The present invention also relates to a pneumatic tire, formed from the rubber composition for tires.

Advantageous Effects of Invention

The method for producing an epoxidized natural rubber according to the present invention includes: Step 1 of coagulating natural rubber latex into granules to prepare a granular solid rubber; and Step 2 of treating the granular solid rubber with an epoxidizing liquid to epoxidize the granular solid rubber. Thus, the method enables to produce a relatively uniformly epoxidized natural rubber in a simple and inexpensive manner as compared to conventional production methods.

Specifically, since natural rubber latex is first coagulated into granules to prepare a granular solid rubber, and the granular solid rubber is then epoxidized, the expensive chemical agents used for the epoxidation can be repeatedly reused without waste to avoid loss of the chemical agents needed for the epoxidation. Also, since the method includes the epoxidation of a granular solid natural rubber having a very large surface area, a relatively uniformly epoxidized natural rubber can be obtained. Furthermore, in this method, the ratio of the amount of waste liquid to the yield of rubber is much smaller than that when latex is epoxidized, and various chemical agents need not to be used. Thus, the environmental burden can also be reduced.

DESCRIPTION OF EMBODIMENTS

Method for Producing Epoxidized Natural Rubber

The method for producing an epoxidized natural rubber of the present invention includes: Step 1 of coagulating natural rubber latex into granules to prepare a granular solid rubber; and Step 2 of treating the granular solid rubber with an epoxidizing liquid to epoxidize the granular solid rubber.

According to conventional production methods in which field latex collected from natural rubber trees is epoxidized, the latex in liquid form undergoes all steps up to epoxidation. Thereafter, the rubber is coagulated and subjected to neutralization of residual acid with alkali, washing, and drying to prepare an epoxidized natural rubber. Thus, in such methods, almost all the chemical agents used for the epoxidation remain in the rubber, and the residual chemical agents are then washed out in the washing step. This means that the chemical agents are used only once without being reused. Moreover, since the wastewater resulting from the washing step contains unreacted formic acid and hydrogen peroxide, the waste liquid needs to be treated to neutralize the acid and decompose the hydrogen peroxide.

In contrast, in the production method of the present invention, a granular solid rubber prepared by coagulating natural rubber latex into granules is allowed to undergo epoxidation by treating the granular solid rubber with an epoxidizing liquid that is capable of epoxidizing rubber, for example, such as by immersing the granular solid rubber in an epoxidizing liquid, such as a peracetic acid-containing liquid formed by mixing acetic acid and/or acetic anhydride with hydrogen peroxide, or a liquid mixture (performic acid-containing liquid) prepared by mixing formic acid with hydrogen peroxide, or alternatively by spraying the epoxidizing liquid to the granular solid, rubber. Thus, unlike the conventional epoxidation step performed on rubber in liquid form, this method allows the recovery of the epoxidizing liquid used in the immersion or spraying treatment. Moreover, as peracetic acid and performic acid each instantly epoxidize nearby natural rubber (in both solid and latex forms) while simultaneously returning to acetic acid and formic acid, respectively, peracetic acid or performic acid can be regenerated by further adding acetic acid or formic acid, and/or hydrogen peroxide to the liquid after the treatment, to control the concentration. This method also has the advantage of hardly allowing the liquid to be diluted as the moisture content hardly increases, unlike the case of latex. Thus, it is possible to reuse the expensive chemical agents used in the treatment liquid. Such reusability also leads to the formation of almost no wastewater, avoiding the need of wastewater treatment. This method is thus advantageous in terms of both the cost and the environmental burden. Furthermore, as there is no risk of failing to control the temperature of the reaction liquid and thereby causing coagulation of the entire latex, strict monitoring of the reaction by the operator is not necessary, which also contributes to the cost reduction.

In the case of a modified natural rubber obtained by removing non-rubber components, an epoxidized natural rubber can be simply produced by adding the epoxidation step in its production process.

Furthermore, in the present invention, since a granular solid rubber having an overwhelmingly large surface area is prepared and then epoxidized, the thus prepared rubber is relatively uniformly epoxidized. Although rubber has the maximum surface area when it is in latex form, epoxidizing agents cannot be reused in this case, as mentioned earlier. Thus, the method of the present invention including coagulation of latex into granules is desirable.

Therefore, according to the present invention, a relatively uniformly epoxidized natural, rubber can be simply produced through a small number of steps in a short time. Moreover, the reuse of the chemical agents contained in the epoxidizing liquid in the production can avoid loss of the chemical agents, thus reducing the cost for waste liquid treatment and the environmental burden. Furthermore, strict monitoring of the reaction by the operator is not necessary.

(Step 1)

In Step 1, natural rubber latex is coagulated into granules to prepare a granular solid rubber.

In general, natural rubber latex is known to coagulate when an acid or salt is added. This mechanism is as follows: Latex particles have a peak particle size of 1 µm and are stable in the serum while repelling one another due to the negative electric charge on their surface. When the amount of latex is sufficiently high, the rubber particles are aggregated at once into a large mass of 10 cm or larger due to the reduction of the negative electric charge by the cation in an acid or salt. The rubber in such a state has an extremely small surface area relative to the weight, and will very slightly react to be epoxidized. As a result, the rubber is practically not modifiable. Even when small portions of the rubber are coagulated to avoid the above problem, the rubber coagula end up aggregating with one another into a large mass upon transfer to a tank for industrial implementation. In contrast, since the method of the present invention includes the epoxidation of a granular natural rubber prepared by coagulating the rubber particles in natural rubber latex into granules, it allows a large surface area and thus provides a uniformly epoxidized natural rubber.

Examples of natural rubber latex include raw latex (field latex collected by tapping natural rubber trees (e.g. *Hevea*); concentrated latex obtained by concentrating field latex by centrifugation or creaming (e.g., purified latex, high-ammonia latex prepared by adding ammonia by an ordinary method, LATZ latex stabilized with zinc oxide, TMTD, and ammonia) deproteinized natural rubber latex prepared by removing non-rubber components such as proteins and phospholipids from the foregoing latex; and modified natural rubber latex such as saponified natural rubber latex. The deproteinized natural rubber latex and the saponified natural rubber latex can be prepared by known methods, such as treatment with a protein-degrading enzyme and alkaline saponification, respectively.

The method for coagulating natural rubber latex into granules to prepare a granular solid rubber may be, for example, such as by controlling the pH of natural rubber latex. In order to prepare rubber particles having a small particle size, in particular, a method is preferred where a flocculant is added to natural rubber latex whose pH is controlled.

The pH is preferably controlled (adjusted) in the range of 3.0 to 5.0, more preferably of 3.5 to 4.5. When the pH is adjusted in the range mentioned above, a particulate rubber (granular solid rubber) can then be obtained. The pH can be controlled with an acid such as formic acid, acetic acid, or sulfuric acid, or with an alkali such as sodium hydroxide or potassium hydroxide. The pH is especially preferably controlled with an acid.

The flocculant may be a polymer flocculant, for instance. Examples of the polymer flocculants include cationic polymer flocculants such as polymers of methyl chloride quaternary salts of dimethylaminoethyl(meth)acrylate; anionic polymer flocculants such as polymers of acrylic acid salts; nonionic polymer flocculants such as acrylic amide polymers; and amphoteric polymer flocculants such as copolymers of a methyl chloride quaternary salt of dimethylaminoethyl(meth)acrylate and an acrylic acid salt. In particular, in terms of efficiently forming the granular rubber, the flocculant is preferably a cationic polymer flocculant, more preferably a poly(meth)acrylate flocculant such as a polymer of a methyl chloride quaternary salt of dimethylaminoethyl (meth)acrylate, and still more preferably a polymer of a methyl chloride quaternary salt of dimethylaminoethyl (meth)acrylate. The cationic polymer flocculant may be a strongly cationic, moderately cationic, or weakly cationic polymer flocculant, and is preferably a strongly cationic polymer flocculant.

The minimum amount of flocculant per 100 parts by mass of the solid content of natural rubber latex is preferably not less than 0.05 parts by mass, and more preferably not less than 0.1 parts by mass. The addition of less than 0.05 parts by mass may be insufficient, resulting in only the partial formation of a granular solid rubber. The maximum amount is preferably not more than 5.0 parts by mass, and more preferably not more than 1.5 parts by mass. If the amount is more than 5.0 parts by mass, an excessive amount of flocculant may adsorb per particle, as a result of which the particles repel each other so that they are dispersed, possibly failing to form aggregates. Such an amount is economically inefficient as well.

Step 1 may be performed in the presence of a surfactant to prepare the granular solid rubber well. The surfactant may be an anionic surfactant, non-ionic surfactant, or amphoteric surfactant. Examples of the anionic surfactants include carboxylate, sulfonate, sulfate, and phosphate anionic surfactants. Examples of the non-ionic surfactants include polyoxyalkylene ether, polyoxyalkylene ester, polyhydric alcohol fatty acid ester, sucrose fatty acid ester, and alkyl polyglycoside non-ionic surfactants. Examples of the amphoteric surfactants include amino acid, betain, and amine oxide amphoteric surfactants. Anionic surfactants are preferred among these, and sulfonate anionic surfactants are more preferred.

The addition of a surfactant is not particularly critical. If added, the minimum amount of surfactant per 100 parts by mass of the solid content of natural rubber latex is preferably not less than 0.1 parts by mass, and more preferably not less than 0.2 parts by mass. The maximum amount is preferably not more than 5.0 parts by mass, and more preferably not more than 2.0 parts by mass. Adjusting the amount within the range mentioned above contributes to providing the granular solid rubber well.

The granular solid rubber obtained in Step 1 preferably has a particle size of not more than 20 mm, more preferably not more than 12 mm, still more preferably not more than 10 mm, and particularly preferably not more than 5 mm. The addition of a flocculant under strict pH control and optionally with appropriate stirring allows the rubber to coagulate into granules so that rubber particles having the aforementioned particle size can be obtained. The minimum particle size of the granular solid rubber is not particularly limited, and is suitably as small as possible, usually not smaller than 0.1 mm. The particle size can be measured by, for example, visual observation or microscopic image analysis.

The granular natural rubber thus obtained still contains a lot of non-rubber components in the serum. It may be washed with water as necessary, or alternatively, it may be washed with water after removing proteins and other contaminants remaining on the surface by further exposure to an alkaline atmosphere. The particle size of the rubber after the water washing tends to be larger than that immediately after the coagulation. However, the increase in the particle size can be suppressed by stirring under appropriate conditions, so that most of the particles can be maintained at a size of not more than several millimeters. The technique to prevent rubber particles from growing greatly according to the present invention has not been recognized even by an ordinary person skilled in the latex art.

The washing step may be performed, for example, such as by adding water to the rubber component (coagulum) and stirring the mixture for a certain period of time to suspend the rubber component in water, followed by causing solid-liquid separation and then collecting the rubber component. The solid-liquid separation may be performed, for example, based on the difference in the specific gravity between the rubber component and water. Specifically, for example, the rubber component may be suspended in water and then allowed to stand still for a certain period of time, followed by removing water having a larger specific gravity than the rubber component from the bottom of the container. Centrifugation may also be performed.

(Step 2)

The granular solid rubber obtained in Step 1 is treated with an epoxidizing liquid to epoxidize the granular solid rubber.

The epoxidizing liquid used in the present invention may be any liquid capable of epoxidizing a granular solid rubber prepared by coagulating natural rubber latex into granules. The epoxidizing liquid may suitably be a peracetic acid-containing liquid, a performic acid-containing liquid or the like.

The peracetic acid-containing liquid may be any liquid that contains or generates peracetic acid. The peracetic acid-containing liquid may suitably be obtained by mixing acetic acid and/or acetic anhydride with hydrogen peroxide and reacting them. In the case of using such a liquid, the peracetic acid generated by the reaction enables the progress of epoxidation. Additionally, by adding acetic acid or acetic anhydride, and/or hydrogen peroxide to the liquid after the treatment to control the concentration, peracetic acid can be regenerated, which also enables the reuse of the treatment liquid.

The acetic acid or acetic anhydride is not particularly limited, and examples thereof include a solution prepared by diluting glacial acetic acid or commercially available acetic acid to an arbitrary concentration. In view of productivity, acetic acid having a concentration of 80 to 100% by mass is preferred, and acetic acid having a concentration of 90 to 100% by mass is more preferred.

The hydrogen peroxide is not particularly limited, and may be a commercially available aqueous hydrogen peroxide solution, for instance. The aqueous hydrogen peroxide solution preferably has a concentration of 10 to 60% by mass, and particularly preferably has a concentration of 30 to 60% by mass in view of reaction efficiency. The aqueous hydrogen peroxide solution having a concentration less than 10% by mass may be easily diluted during repetitive use. The aqueous hydrogen peroxide solution having a concentration more than 60% by mass may explode. In view of the possibility of explosion, in particular, the aqueous hydrogen peroxide solution suitably has a concentration that is not more than 50% by mass and is close to this concentration.

Acetic acid and/or acetic anhydride may be mixed and reacted with hydrogen peroxide by any method including conventionally known methods. For example, when a 30% by mass aqueous hydrogen peroxide solution and 90% by mass acetic acid are gently mixed together and reacted for 1 to 2 days, peracetic acid is generated. In this reaction, they do not react completely but form an equilibrium mixture in which hydrogen peroxide, peracetic acid, and acetic acid coexist. Then, once the granular solid rubber is placed in the peracetic acid-containing liquid in such an equilibrium state, peracetic acid rapidly reacts with the rubber so that the rubber is epoxidized while the peracetic acid returns to acetic acid. This is based on an acetic acid-catalyzed mechanism in which hydrogen peroxide is decomposed into water and oxygen and this oxygen reacts with the rubber.

The hydrogen peroxide is preferably added in an amount of 0.05 to 5 mol relative to 1 mol of acetic acid and/or acetic anhydride, and more preferably added in an amount of 0.1 to 2 mol in consideration of safety and efficiency. An amount less than 0.05 mol may lead to a significant reduction in the rate of conversion of acetic acid, which is not economical. Also, if the amount is more than 5 mol, the rate of conversion of hydrogen peroxide may be significantly reduced, which is not economical.

A trace amount of an acid such as sulfuric acid is preferably added to accelerate the reaction.

The peracetic acid-containing liquid after the reaction practically contains almost no peracetic acid. Hence, by adding hydrogen peroxide and optionally acetic acid or glacial acetic acid to this liquid and leaving the mixture for a certain period of time again, peracetic acid can be regenerated and this peracetic acid can be allowed to react with the rubber. In this manner, the liquid after the reaction can be reused. Since peracetic acid quantitatively reacts with rubber, the degree of epoxidation of rubber can be controlled based on the amount of the peracetic acid-containing liquid and the concentration of peracetic acid.

The performic acid-containing liquid may be any liquid that contains or generates performic acid. Suitable examples of the performic acid-containing liquid include a liquid mixture of formic acid and hydrogen peroxide, and a liquid obtained by mixing formic acid with hydrogen peroxide and reacting them. In the case of using such a liquid, the performic acid generated by the reaction enables the progress of epoxidation. Additionally, by adding formic acid and/or hydrogen peroxide to the liquid after the treatment to control the concentration, performic acid can be regenerated, which also enables the reuse of the treatment liquid.

The formic acid is not particularly limited, and examples thereof include a solution prepared by diluting commercially available formic acid to an arbitrary concentration. In view of productivity, safety, and a target degree of epoxidation, formic acid having a concentration of 10 to 100% by mass is preferred, and formic acid having a concentration of 30 to 94% by mass is more preferred.

The hydrogen peroxide is not particularly limited, and may be as mentioned above.

The performic acid-containing liquid may be a liquid of performic acid previously formed by mixing formic acid and hydrogen peroxide. Since performic acid is unstable, a liquid mixture of formic acid and hydrogen peroxide is preferably used. More specifically, it is preferred to immerse the granular solid rubber in formic acid, gradually dropwise adding and mixing hydrogen peroxide thereto to form performic acid, and reacting the performic acid with the granular solid rubber. Once the granular solid rubber is placed in the performic acid-containing liquid prepared by mixing formic acid and hydrogen peroxide, performic acid rapidly reacts with the rubber so that the rubber is epoxidized while the performic acid returns to formic acid. This is based on a formic acid-catalyzed mechanism in which hydrogen peroxide is decomposed into water and oxygen and this oxygen reacts with the rubber. Also usable are epoxidizing liquids containing both performic acid and peracetic acid, prepared by reacting hydrogen peroxide with a mixture in which formic acid and acetic acid and/or acetic anhydride coexist, to generate both performic acid and peracetic acid.

The hydrogen peroxide is preferably added in an amount of 0.05 to 5 mol relative to 1 mol of formic acid, and more preferably added in an amount of 0.1 to 2 mol in consideration of safety and efficiency. An amount less than 0.05 mol may lead to a significant reduction in the rate of conversion of formic acid, which is not economical. If the amount is more than 5 mol, the rate of conversion of hydrogen peroxide may be significantly reduced, which is not economical.

A trace amount of an acid such as sulfuric acid is preferably added to accelerate the reaction.

The performic acid-containing liquid after the reaction practically contains almost no performic acid. Hence, by adding hydrogen peroxide and optionally formic acid to this liquid, the resulting mixed liquid can be allowed to react with the rubber. In this manner, the liquid after the reaction can be reused. Since performic acid quantitatively reacts with rubber, the degree of epoxidation of rubber can be controlled based on the amount of the performic acid-containing liquid and the concentration of performic acid.

In the present invention, the granular solid rubber is epoxidized by treatment with an epoxidizing liquid.

The treatment may be performed by any method that allows a granular solid rubber and an epoxidizing liquid to contact each other. Examples thereof include immersion; and spraying with sprays, showering, and other spraying methods. Specifically, immersion may be easily performed by placing a granular solid rubber in a casing in the form of a perforated basket and immersing this casing directly in an epoxidizing liquid to cause reaction, followed by pulling out from the liquid. Also, spraying may be performed, for example, by passing such a basket through a shower of an epoxidizing liquid, or alternatively by spraying such a basket with an epoxidizing liquid. These methods allow to easily collect and reuse excess epoxidizing liquid or the epoxidizing liquid after the treatment. Moreover, in these methods, the acids remaining on the surface can be very easily washed out as mentioned later.

The epoxidation can be performed, without using such a particular basket, by directly placing a granular solid rubber in an ordinary tank containing an epoxidizing liquid to cause reaction, and then pulling it out. Specifically, in the case of including a lot of rubber particles having a small particle size, granular natural rubber aggregates are placed in a tank, and then an epoxidizing liquid is poured into the tank to cause reaction. After the reaction, only the epoxidizing liquid can be removed from the bottom of the tank. This is because natural rubber floats due to its specific gravity as low as 0.91 to 0.93. Moreover, the epoxidizing liquid thus removed can be reused as mentioned earlier. This process may be performed per batch. Alternatively, the epoxidizing liquid and the granular solid rubber may be continuously supplied and reacted, followed by continuously taking out the resulting rubber. The container for the reaction may be an ordinary tank. Since the container is exposed to an acidic atmosphere, it may be possible to coating the surface, use stainless steel, or use an inert resin. In order to make the entire system homogeneous, the reaction is desirably, but not necessarily, performed while stirring.

The time for treating the granular solid rubber with the epoxidizing liquid is not particularly limited as long as epoxidation can be allowed to proceed as desired. For example, the time may be one second to 48 hours. If the time is shorter than the minimum time, the reaction tends not to proceed sufficiently. The time may be longer than the maximum time without causing any problems. However, considering that productivity is then not good because the reaction has almost been completed and that the rubber should be prevented from being deteriorated by the residual hydrogen peroxide, the time is desirably not longer than one hour.

In particular, in the case where the granular solid rubber is treated with the peracetic acid-containing liquid, the minimum time is not shorter than one second, preferably not shorter than 10 seconds, and more preferably not shorter than 30 seconds. The maximum time is, but not limited to, not longer than one hour, preferably not longer than 30 minutes, and more preferably not longer than 10 minutes. In the case where the granular solid rubber is treated with the performic acid-containing liquid, the minimum time is preferably not shorter than 10 seconds, and more preferably not shorter than 30 seconds. The maximum time is, but not limited to, not longer than 48 hours, preferably not longer than 24 hours.

The treatment temperature (reaction temperature) is not particularly limited as long as epoxidation can be allowed to proceed as desired. For example, the treatment temperature may be 10 to 75° C. In particular, in the case where the granular solid rubber is treated with the peracetic acid-containing liquid, since the reaction is rapid, the treatment temperature needs not to be so high and is not lower than 10° C., preferably not lower than 15° C., and more preferably not lower than 20° C. The maximum temperature is not particularly limited. The reaction sufficiently proceeds even at a temperature of 30 to 40° C., and proceeds at room temperature, which is also preferred from an energy viewpoint. Also in the case where the granular solid rubber is treated with the performic acid-containing liquid, the reaction temperature is not lower than 30° C., preferably not lower than 50° C. The maximum temperature is preferably controlled to not higher than 75° C. in view of the risk of explosion of performic acid.

The degree of epoxidation may be controlled depending on desired physical properties. Epoxidation is a reaction where part of the double bonds in natural rubber (cis-1,4-isoprene) are converted as shown below. The degree of epoxidation is defined as the ratio of the epoxidized double bond content to the total double bond content. Commercially available products have a degree of epoxidation of 12.5%, 25%, 37.5%, 50%, or 60%. The degree of epoxidation is not limited to these values; for example, it may be less than 1% or at most more than 60%. For use in tires, rubbers having a degree of epoxidation of approximately 0.1 to 50% may be used depending on the particular tire components. In consideration of the performance balance, the maximum degree of epoxidation is approximately 30%.

Since the degree of epoxidation is determined by the relation between the amount of peracetic acid and/or performic acid in the liquid and the amount of double bonds in the rubber, it can be controlled by adjusting these amounts.

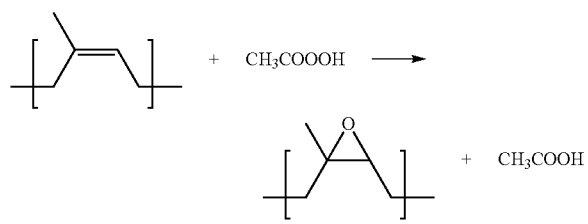

It is desirable that the epoxidized rubber thus prepared should be immersed in or sprayed, showered or treated by other spraying methods with water or an aqueous alkaline solution to wash out acids. Acid residues may reduce scorch time or retard vulcanization. Since peracetic acid has already reacted with the rubber, washing out of the acids does not inhibit the reaction or reduce the degree of epoxidation. In the case of using an aqueous alkaline solution, it is desirable that the rubber should be finally washed with almost neutral water.

Examples of the aqueous alkaline solutions include sodium carbonate, sodium bicarbonate, potassium carbonate, potassium bicarbonate, ammonia water, sodium hydroxide, and potassium hydroxide. In view of odor and safety, suitable are sodium carbonate, sodium bicarbonate, potassium carbonate, potassium bicarbonate, each having a concentration of approximately 0.5 to 5%, and the like.

The time for neutralization or washing with an aqueous alkaline solution or water is one second to one day, preferably 10 seconds to 4 hours, and more preferably 20 seconds to 2 hours as such period of time allows sufficient neutralization or washing out of the acids remaining on the surface.

The rubber obtained as above is appropriately dried as necessary, so that the epoxidized natural rubber of the present invention is produced. The drying may be performed by any method. The rubber may be dried with a conventional drier for drying TSR, or may be dried by applying hot air to the rubber placed on a conveyer belt. Though not common, microwave heating or vacuum drying may also be employed. Moreover, the rubber may be formed into a sheet with a creper or the like and then dried as it is.

The drying temperature is not particularly limited. Usually, the drying can be performed at room temperature or higher temperatures. In consideration of productivity, the temperature is not lower than 60° C., preferably not lower than 70° C., and more preferably not lower than 80° C. Considering that rubber tends to deteriorate at high temperatures, the maximum temperature is not higher than 140° C., preferably not higher than 135° C., and more preferably not higher than 130° C. The drying time may be appropriately set to a time at which no undried portion is present, depending on the drying temperature. The epoxidized rubber tends to have less heat resistance than normal natural rubber. Thus, the drying is preferably performed at a low temperature that does not hinder productivity.

The rubber prepared by treating a granular solid rubber with an epoxidizing liquid for epoxidation according to the present invention is fairly uniformly epoxidized. Still in this method, the surface of the rubber tends to be more easily epoxidized, as compared to the methods of epoxidizing latex. However, when the obtained rubber is used solely or blended with another rubber (e.g. natural rubber, SBR) and, in particular, silica is combined therewith, the affinity between the epoxidized natural rubber and silica is enhanced, which leads to better dispersion of silica and therefore a reduction in tan δ and higher rubber strength. These effects are comparable to those of the expensive epoxidized natural rubber prepared using a latex-based process, but can be achieved at a greatly lower cost.

Other Methods for Producing Epoxidized Natural Rubber

In addition to the aforementioned method, the method for producing an epoxidized natural rubber of the present invention includes another production method including treating a solid rubber formed by coagulation of natural rubber latex with an epoxidizing liquid to epoxidize the solid rubber.

In the other production method, a solid rubber formed by coagulation of natural rubber latex is allowed to undergo epoxidation by treating the solid rubber with an epoxidizing liquid capable of epoxidizing rubber. Thus, unlike the conventional epoxidation step performed on rubber in liquid form, this method allows the recovery of the epoxidizing liquid used in the immersion or spraying treatment. Moreover, as peracetic acid and performic acid each instantly epoxidize nearby natural rubber (in both solid and latex forms) while simultaneously returning to acetic acid and formic acid, respectively, peracetic acid or performic acid can be regenerated by further adding acetic acid or formic acid, and/or hydrogen peroxide to the liquid after the treatment, to control the concentration. This method also has the advantage of hardly allowing the liquid to be diluted as the moisture content hardly increases, unlike the case of latex. Thus, it is possible to reuse the expensive chemical agents used in the treatment liquid. Such reusability also leads to the formation of almost no wastewater, avoiding the need of wastewater treatment. This method is thus advantageous in terms of both the cost and the environmental burden. Furthermore, as there is no risk of failing to control the temperature of the reaction liquid and thereby causing coagulation of the entire latex, strict monitoring of the reaction by the operator is not necessary, which also contributes to the cost reduction.

In addition, an epoxidized natural rubber can be produced by simply adding the epoxidation step to a conventional process for producing TSR.

Thus, the other production method allows to produce an epoxidized natural rubber in a simple manner through a small number of steps in a short time. Moreover, the reuse of the chemical agents contained in the epoxidizing liquid in the production can avoid loss of the chemical agents, thus reducing the cost for waste liquid treatment and the environmental burden. Furthermore, strict monitoring of the reaction by the operator is not necessary.

(Solid Rubber)

The natural rubber latex used in the other production method may be as mentioned above.

Examples of solid rubbers formed by coagulating such natural rubber latexes include cup lump, unsmoked sheets (USS) and cup lump coagulated with field latex (slab).

For example, the cup lump may be a coagulated natural rubber which is formed when natural rubber latex accumulated in a cup for collecting natural rubber is naturally coagulated by an fatty acid generated by microbial degradation of non-rubber components, or may be a coagulated natural rubber which is formed by previously placing a chemical agent capable of coagulating natural rubber latex in a cup and then forcibly and rapidly coagulating natural rubber latex. The chemical agent may be any chemical agent having such capability, and examples thereof include acids such as sulfuric acid, formic acid, hydrochloric acid, or acetic acid; cations such as calcium ion, and salts thereof, and organic solvents such as methanol or ethanol. The cup lump is literally in the shape of a cup and contains impurities. Hence, if the cup lump is directly epoxidized, only the outermost surface is epoxidized, resulting in the entire rubber having a low degree of epoxidation. Thus, finely cut solid rubber is suitably used in the present invention.

In general, cup lump is processed into a rubber that is technically classified as TSR. The processing includes repeating the steps of finely cutting with a machine such as a prebreaker or hammer mill and washing with water, as well as reducing the thickness of rubber with several crepers to wash out the impurities in rubber and further remove water-soluble substances. Finally, the rubber thus obtained is finely cut into a size of not more than 2 to 3 mm with a machine known as shredder, and then dried. The resulting rubber has a very large surface area. Thus, a lot of portions of the solid rubber can be epoxidized, for example, by immersing in or spraying with an epoxidizing liquid. If the rubber having a small surface area (in the form of a large mass) is epoxidized, the surface thereof is excessively epoxidized while the inside is not epoxidized. Thus, the modified portion of the resulting rubber may form hard aggregates during kneading. Furthermore, since there is no risk of the rubber coagulating during epoxidation, strict attention on the control of the reaction temperature is not required and therefore the process can be automated.

(Epoxidizing Liquid)

The epoxidizing liquid used in the other production method may be any liquid capable of epoxidizing a solid rubber formed by coagulation of natural rubber latex. It may suitably be the aforementioned peracetic acid-containing liquid or performic acid-containing liquid, for instance.

(Epoxidation Step)

In the other production method, the solid rubber is epoxidized by treating it with the epoxidizing liquid.

This treatment is not particularly limited as long as it allows the solid rubber to contact the epoxidizing liquid. The treatment may be performed as mentioned above, and the same treatment time and temperature conditions may be employed.

The epoxidation step in the other production method may also be performed by kneading the solid rubber with the epoxidizing liquid to epoxidize the solid rubber. Specifically, for example, the solid rubber can be epoxidized by introducing the solid rubber and the epoxidizing liquid into a mixer (e.g. a kneader, an extruder) and kneading these materials. In particular, in the case were a finely cut solid rubber is used, the proportion of the inside to the surface of the rubber finely cut is still high. However, even the inside of the rubber can be epoxidized by supplying and kneading the finely cut rubber and the epoxidizing liquid to a machine capable of kneading rubber to expose a new surface (e.g., an extruder, a kneader, or a creper).

The epoxidation step may also be suitably performed by treating the solid rubber with the epoxidizing liquid to prepare an epoxidized solid rubber, and kneading the epoxidized solid rubber and optionally a separate epoxidizing liquid, such as a peracetic acid-containing liquid or a performic acid-containing liquid, to epoxidize the epoxidized solid rubber. In this case as well, the use of a finely cut solid rubber allows epoxidation to proceed until the inside of the rubber is sufficiently epoxidized.

As mentioned earlier, the degree of epoxidation can be controlled depending on desired physical properties.

(Neutralization, Washing)

The epoxidized rubber prepared as above may be neutralized and/or washed in the same manner as mentioned above.

The size of rubber particles may be increased in the case of kneading the solid rubber and the epoxidizing liquid with an extruder or a kneader. Such a rubber is difficult to wash or dry, and thus is desirably cut finely by passing the rubber through a shredder again before neutralization and/or washing.

Moreover, in the case of kneading the solid rubber and the epoxidizing liquid with an extruder or a kneader, it is suitable to ensure immersion for at least one hour, preferably for two to four hours, to completely neutralize the acids inside the rubber. Also, when an aqueous alkaline solution is used for the neutralization, the solution is desirably then washed out by a shower of tap water or the like.

(Drying)

The rubber obtained as above is appropriately dried as necessary, so that the epoxidized natural rubber of the present invention is produced. The drying may be performed as mentioned above.

Since the other production method is a method for producing an epoxidized natural rubber, including treating a solid rubber formed by coagulation of natural rubber latex with an epoxidizing liquid to epoxidize the solid rubber, the method allows to produce an epoxidized natural rubber in a simple and inexpensive manner as compared to conventional methods.

Specifically, since a solid natural rubber is epoxidized, the expensive chemical agents used for the epoxidation can be repeatedly reused without waste to avoid loss of the chemical agents needed for the epoxidation. Moreover, since a conventional process of coagulating or neutralizing latex can be omitted, the production time can be greatly reduced. Furthermore, common factories for epoxidized natural rubber need latex storage tanks, reaction tanks, coagulation devices (using, for example, steam), long water baths, driers, or other facilities; however, according to the method of the present invention, only the epoxidation process needs to be added to the process in TSR factories. It is thus possible to produce TSR while producing epoxidized natural rubber from a part thereof, which can lead to a great reduction in cost. In addition, the ratio of the amount of waste liquid to the yield of rubber is much smaller than that when latex is epoxidized, and various chemical agents need not to be used. Thus, the environmental burden can also be reduced.

Moreover, in the case where the solid rubber is epoxidized by treating it with the epoxidizing liquid according to the other production method, the rubber is only epoxidized at the surface and is thus difficult to epoxidize thoroughly and uniformly as in the case of latex. However, when the rubber is used solely or blended with another rubber (e.g. natural rubber, SBR) and, in particular, silica is combined therewith, the affinity between the epoxidized natural rubber and silica is enhanced, which leads to better dispersion of silica and therefore a reduction in tan δ and higher rubber strength. These effects are comparable to those of the expensive epoxidized natural rubber prepared using a latex-based process, but can be achieved at a greatly lower cost.

Epoxidized Natural Rubber

The epoxidized natural rubbers produced by the production method of the present invention and by the other production method are useful especially as materials for tires.

The glass transition point of natural rubber increases as the natural rubber is epoxidized. Specifically, a 1% increase in degree of epoxidation is associated with an increase in glass transition point by about one degree. When natural rubber is highly epoxidized, it has a much higher glass transition point; therefore, the coefficient of friction in wet conditions is increased so that the braking distance in rain is reduced. Epoxidized natural rubber at the same time tends to have a higher rolling resistance so that fuel economy can deteriorate. Moreover, since epoxidized natural rubber becomes harder at low temperatures, it tends to be unsuitable for winter tires. However, when epoxidized natural rubber has a low degree of epoxidation, it shows a low elastic modulus at low temperatures and thus can be suitably used for winter tires and the like. Moreover, as the polarity of rubber is increased by epoxidation, epoxidized rubber has a higher affinity with silica used as a filler, which results in improved fuel economy. In the present invention, even a rubber with a degree of epoxidation as low as mentioned above has a sufficient affinity with silica, and it is thus acceptable to reduce the glass transition point. Therefore, the epoxidized rubber of the present invention can be suitably used for winter tires and the like.

Rubber Composition for Tires

The rubber composition for tires containing the epoxidized natural rubber of the present invention may be a rubber composition that contains a rubber component including the epoxidized natural rubber, and carbon black and/or a white filler.

In the rubber composition, the amount of the epoxidized natural rubber based on 100% by mass of the rubber component is preferably not less than 5% by mass, more preferably not less than 50% by mass, and still more preferably not less than 80% by mass, and may be 100% by mass. If the amount is less than 5% by mass, silica, if used, may not sufficiently disperse.

The rubber composition may contain rubber materials other than the epoxidized natural rubber in the rubber component. Examples thereof include natural rubber (NR), polyisoprene rubber (IR), polybutadiene rubber (BR), styrene butadiene rubber (SPR), styrene isoprene butadiene rubber (SIBR), ethylene propylene diene rubber (EPDM), chloroprene rubber (CR), and acrylonitrile butadiene rubber (NBR).

The rubber composition preferably contains silica as a white filler.

The silica has a nitrogen adsorption specific surface area ($N_2SA$) of not smaller than 80 $m^2/g$, preferably not smaller than 100 $m^2/g$, and more preferably not smaller than 120 $m^2/g$. Also, the $N_2SA$ of silica is preferably not larger than 250 $m^2/g$, and more preferably not larger than 200 $m^2/g$. When silica having a $N_2SA$ falling within the range mentioned above is used, physical properties such as fuel economy and rubber strength can be ensured.

The $N_2SA$ values of silica are determined by the BET method in accordance with ASTM D3037-93.

The amount of silica per 100 parts by mass of the rubber component is preferably not less than 10 parts by mass, and more preferably not less than 30 parts by mass. The amount of silica is preferably not more than 150 parts by mass, and more preferably not more than 100 parts by mass. If the amount of silica falls within the range mentioned above, physical properties such as fuel economy and rubber strength can be ensured.

The rubber composition of the present invention may contain, in addition to the aforementioned materials, additives commonly used in the tire industry, such as zinc oxide, stearic acid, various antioxidants, sulfur, and vulcanization accelerators.

The rubber composition of the present invention may be prepared by a known method. For example, the rubber composition can be prepared by a method of kneading the above components using a rubber mixing apparatus such as an open roll mill or a Banbury mixer, and then vulcanizing the kneaded mixture. The rubber composition is usable for components of tires, and especially suitably in treads and the like.

Pneumatic Tire

The pneumatic tire of the present invention can be produced by a conventional method using the above rubber composition. Specifically, for example, the pneumatic tire can be formed by extruding the unvulcanized rubber composition containing materials as appropriate into the shape of, for example, a tread, forming an unvulcanized tire in a tire building machine by a conventional building method, and pressurizing the unvulcanized tire under heating in a vulcanizer.

EXAMPLES

Hereinafter, the present invention will be more specifically described by reference to examples which, however, are not intended to limit the scope of the present invention.

Evaluation

The physical properties of raw rubbers and vulcanized rubber sheets prepared in examples were evaluated by the methods mentioned below. Tables 1 to 3 show the results. The vulcanized rubber sheets were prepared by the following method.
(Preparation of Vulcanized Rubber Sheet)

The chemical agents in formulation amounts shown in Table 1 to 3, except the sulfur and the vulcanization accelerators, were kneaded in a 1.7 L Banbury mixer. Thereafter, the sulfur and the vulcanization accelerators were added to the kneaded mixture, and they were kneaded with a roll mill to give an unvulcanized rubber composition. The unvulcanized rubber composition was press-vulcanized at 170° C. for 6 minutes to give a vulcanized rubber sheet.
(Measurement of Degree of Epoxidation)

After kneading the prepared epoxidized natural rubber with a roll mill for 1 minute, specimens were collected at several points. Each specimen was dissolved in toluene, reprecipitated in methanol, and dried to prepare a sample (purified product) to be measured. A $^1$H-NMR apparatus of JNM-ECA series (produced by JEOL Ltd.) was used for the measurement.

The degree of epoxidation (%) was calculated based on the following equation.

(Degree of epoxidation (%))=$B/(A+B)\times 100$ wherein A represents an integral of peaks (5.0-5.2 ppm) derived from the protons of the cis form, and B represents an integral of peaks (2.6-2.8 ppm) derived from the protons of the epoxy group.

In a simplified method, the glass transition point of each polymer was determined using a differential scanning calorimeter, Pyris Jade DSC (produced by PerkinElmer), and then the degree of epoxidation was estimated using a calibration curve. The calibration curve was prepared from the degrees of epoxidation determined by NMR and the glass transition points of commercially available epoxidized natural rubbers.
(Rubber Strength)

A No. 3 dumbbell-shaped test sample prepared from each vulcanized rubber sheet was subjected to tensile tests in accordance with JIS K6251 "Rubber, vulcanized or thermoplastic—Determination of tensile stress-strain properties" to measure the tensile strength at break (TB) and the elongation at break (SB). A product of TB×EB was then calculated, and expressed as an index relative to the rubber strength (TB×EB) in Comparative Example 1 taken as 100, according to the following equation. A higher index indicates higher rubber strength.

(Rubber strength index)=($TB\times EB$ of each formulation)/($TB\times EB$ in Comparative Example 1)×100

(Dispersion of Silica)

Each vulcanized rubber sheet was measured for degree of dispersion of silica by the method for measuring the degree of dispersion of carbon black in accordance with ASTM-D2663-B. A larger value, indicates better dispersion, with the maximum value being 100%. The results are indicated by the following symbols:
++: (Degree of dispersion)≥97.5%;
+: 97.5%>(Degree of dispersion)≥95%;
±: 95%>(Degree of dispersion)≥92%;
−: 92%>(Degree of dispersion).

The chemical agents used in Examples 1-1 to 1-5 and Comparative Examples 1-1 to 1-4 are listed below.
Field latex (FL): Field latex within 3 days after its collection in southern Thailand (mixed with ammonia water for preventing decay and coagulation, wherein the latex had an ammonia content adjusted to 0.2% by mass; the dry rubber content was adjusted to 30%)
Natural rubber latex: Low ammonia latex in which ammonia, a trace amount of zinc oxide, and tetrathiuram disulfide were added for imparting decay resistance and stability (dry rubber content: 60% by mass; ammonia content: 0.2% by mass) Surfactant A-1: Polyoxyethylene fatty acid alcohol (the number of carbon atoms in the alcohol: 12 to 18; cloud point: 70 to 80° C.)
Surfactant B-1: Sodium polyoxyethylene lauryl ether sulfate
Acetic acid: Active ingredient content: 98% or 94%, Grade: extra pure
Formic acid: Active ingredient content: 80%, Grade: extra pure
Aqueous hydrogen peroxide: Active ingredient content: 50%, used after appropriate dilution
Sulfuric acid: Active ingredient content: 98%
Sodium carbonate: Anhydrous sodium carbonate (purity: 99% or higher)
Sodium hydroxide: Purity: 98%
Flocculant: Cationic polymer flocculant (purity: 100%; strongly cationic polymer flocculant "ARONFLOC C312" (polymethacrylate flocculant) produced by MT AquaPolymer, Inc.)
Silica: ULTRASIL VN3 produced by Degussa
Silane coupling agent: Si266 (bis(3-triethoxysilylpropyl)disulfide)
Zinc oxide: Zinc oxide #2 produced by Mitsui Mining & Smelting Co., Ltd.
Stearic acid: Stearic acid beads "Tsubaki" produced by NOF Corporation
Calcium stearate: Calcium stearate GE-200 produced by NOF Corporation
Oil: Palm oil olein
Sulfur: 5% oil-containing sulfur
Vulcanization accelerator TBBS: Nocceler NS produced by Ouchi Shinko Chemical Industrial Co., Ltd.
Vulcanization accelerator DPG: Nocceler D produced by Ouchi Shinko Chemical Industrial Co., Ltd.

Examples 1-1 to 1-5 and Comparative Examples 1-1 to 1-4

Production Example 1-1

Preparation of Peracetic Acid (Preparation of Peracetic Acid-Containing Liquid a-1)

A peracetic acid-containing liquid a-1 was prepared by mixing 612 g of acetic acid (98%), 850 g of aqueous hydrogen peroxide (20%), and 5 g of sulfuric acid (98%), and then allowing the mixture to stand at a temperature of 40° C. for 2 days. The concentration of peracetic acid generated was measured and found to be 8.3% by mass. In the measurement of the concentration of peracetic acid, a peracetic acid counter PA-300 produced by Hiranuma Sangyo Co., Ltd was used. The measurement was performed in the same manner in the following.
(Preparation of Peracetic Acid-Containing Liquid b-1)

A peracetic acid-containing liquid b-1 was prepared by adding 155 g of aqueous hydrogen peroxide (20%) to the rest of the peracetic acid-containing liquid a-1 used in Example 1-1 mentioned later, and then allowing the mixture to stand at a temperature of 40° C. for 2 days. The concentration of peracetic acid generated was measured and found to be 7.8% by mass.

Production Example 1-2

Preparation of Aqueous Surfactant Solution A-1

A 15% by mass aqueous surfactant solution A-1 was prepared by dissolving 150 g of polyoxyethylene fatty acid alcohol (the number of carbon atoms in the alcohol: 12 to 18; cloud point: 75° C.) in 850 g of ion exchange water.

Production Example 1-3

Preparation of Aqueous Surfactant Solution B-1

A 10% by mass aqueous surfactant solution B-1 was prepared by dissolving 100 g of sodium polyoxyethylene lauryl ether sulfate (active ingredient content: 70%) in 600 g of ion exchange water.

Example 1-1

The aqueous surfactant solution B-1 in an amount of 60 g was added to 3 kg of FL (dry rubber content: 30% by mass). Subsequently, sulfuric acid (2% by mass) was added to adjust the pH to 4.0. To the mixture was added 3 kg of a flocculant (0.1% by mass) to coagulate rubber into granules. About most of the granules had a particle size (particle diameter) falling within the range of 1 to 3 mm, with smaller granules and larger granules having a particle size of not more than 1 mm and of approximately 5 mm, respectively. After stopping stirring and almost completely removing the lower aqueous phase, water was added, the mixture was stirred, and floating rubber was skimmed off and washed with water again. This washing procedure was repeated three times. The washed rubber still had almost the same particle size, i.e., mostly a particle size of 1 to 3 mm.

The rubber containing water was drained through a sieve, and about 1 kg of the resulting rubber was immersed in the peracetic acid-containing liquid a-1 at an initial temperature of 30° C. for 10 minutes (during the immersion, the rubber was held in the liquid while being rotated to uniformly immerse the rubber). After pulling out from the liquid, the rubber was showered with tap water for 20 seconds. Then, the rubber was immersed in an aqueous sodium carbonate solution (2% by mass) for 10 minutes and again showered with tap water for 20 seconds. The resulting rubber was dried in an oven at a temperature of 90° C. for 4 hours to give an epoxidized natural rubber.

Example 1-2

The aqueous surfactant solution B-1 in an amount of g was added to 3 kg of FL at room temperature. Subsequently, 360 g of an aqueous sodium hydroxide solution containing 90 g of sodium hydroxide was added, and the mixture was allowed to stand for 24 hours while stirring. Thereto was added a dispersion containing 9 g of a phenolic antioxidant (Nocrac NS-6 produced by Ouchi Shinko Chemical Industrial Co., Ltd.), followed by further stirring for 2 hours. To the resulting FL was slowly added formic acid (2% by mass) to adjust the pH to 4. To the resulting mixture was added 3 kg of a flocculant (0.1% by mass) to aggregate rubber particles into granules. Most of the granules had a particle size of approximately 1 to 3 mm. The resulting aggregates were skimmed off with a sieve and washed with water, and this procedure was repeated four times in total. The rubber containing water was drained through a sieve, and about 1 kg of the resulting rubber was immersed in a peracetic acid-containing liquid a-1 prepared separately from that in Example 1-1, at an initial temperature of 30° C. for 10 minutes (during the immersion, the rubber was held in the liquid while being rotated to uniformly immerse the rubber). After pulling out from the liquid, the rubber was showered with tap water for 20 seconds. Then, the rubber was immersed in an aqueous sodium carbonate solution (2% by mass) for 10 minutes, and again showered with tap water for 20 seconds. The resulting rubber was dried in an oven at a temperature of 90° C. for 4 hours to give an epoxidized natural rubber.

Example 1-3

The aqueous surfactant solution B-1 in an amount of 60 g was added to 3 kg of FL at room temperature. Subsequently, 360 g of an aqueous sodium hydroxide solution containing 90 g of sodium hydroxide was added, and the mixture was allowed to stand for 24 hours while stirring. Thereto was added a dispersion containing 9 g of a phenolic antioxidant (Nocrac NS-6 produced by Ouchi Shinko Chemical Industrial Co., Ltd.), followed by further stirring for 2 hours. To the resulting FL was slowly added formic acid (2% by mass) to adjust the pH to 4. To the resulting mixture was added 3 kg of a flocculant (0.1% by mass) to aggregate rubber particles into granules. Most of the granules had a particle size of approximately 1 to 3 mm. The resulting aggregates were skimmed off with a sieve and washed with water, and this procedure was repeated four times in total. The rubber containing water was immersed in an aqueous sodium carbonate solution (2% by mass) for 1 hour, and then washed with water by showering with tap water for 20 seconds. The resulting rubber was drained through a sieve, and about 1 kg of the rubber was then immersed in a peracetic acid-containing liquid a-1 prepared separately from those in Examples 1-1 and 1-2, at an initial temperature of 30° C. for 10 minutes (during the immersion, the rubber was held in the liquid while being rotated to uniformly immerse the rubber). After pulling out from the liquid, the rubber was showered with tap water for 20 seconds. Then, the rubber was immersed in an aqueous sodium carbonate solution (2% by mass) for 10 minutes, and again showered with tap water for 20 seconds. The resulting rubber was dried in an oven at a temperature of 90° C. for 4 hours to give an epoxidized natural rubber.

Example 1-4

The aqueous surfactant solution B-1 in an amount of 60 g was added to 3 kg of FL. Subsequently, sulfuric acid (2% by mass) was added to adjust the pH to 4.0. To the mixture was added 3 kg of a flocculant (0.1% by mass) to coagulate rubber into granules. About most of the granules had a particle size falling within the range of 1 to 3 mm, with smaller granules and larger granules having a particle size of not more than 1 mm and of approximately 5 mm, respectively. After stopping stirring and almost completely removing the lower aqueous phase, water was added, the mixture was stirred, and floating rubber was skimmed off and washed with water again. This washing procedure was repeated three times. The washed rubber still had almost the same particle size, i.e., mostly a particle size of 1 to 3 mm.

The rubber containing water was drained through a sieve, and about 1 kg of the resulting rubber was immersed in the peracetic acid-containing liquid b-1 at an initial temperature of 30° C. for 10 minutes (during the immersion, the rubber was held in the liquid while being rotated to uniformly immerse the rubber). After pulling out from the liquid, the rubber was showered with tap water for 20 seconds. Then, the rubber was immersed in an aqueous sodium carbonate solution (2% by mass) for 10 minutes, and again showered with tap water for 20 seconds. The resulting rubber was dried in an oven at a temperature of 90° C. for 4 hours to give an epoxidized natural rubber.

Example 1-5

The aqueous surfactant solution B-1 in an amount of 60 g was added to 3 kg of FL. Subsequently, sulfuric acid (2% by mass) was added to adjust the pH to 4.0. To the mixture was added 3 kg of a flocculant (0.1% by mass) to coagulate rubber into granules. About most of the granules had a particle size falling within the range of 1 to 3 mm, with smaller granules and larger granules having a particle size of not more than 1 mm and of approximately 5 mm, respectively. After stopping stirring and almost completely removing the lower aqueous phase, water was added, the mixture was stirred, and floating rubber was skimmed off and washed with water again. This washing procedure was repeated three times. The washed rubber still had almost the same particle size, i.e., mostly a particle size of 1 to 3 mm.

The rubber containing water was skimmed with a sieve, and transferred into an aqueous formic acid solution containing 920 g of formic acid in 2 kg of ion exchange water. Thereto was slowly added 500 g of hydrogen peroxide (50% by mass). Five hours later, the rubber was taken out, and showered with tap water for 20 seconds. Then, the rubber was immersed in an aqueous sodium carbonate solution (2% by mass) for 10 minutes, and again showered with tap water for 20 seconds. The resulting rubber was dried in an oven at a temperature of 90° C. for 4 hours to give an epoxidized natural rubber.

Comparative Example 1-1

To low ammonia natural rubber latex having a dry rubber content of 60% by mass (500 g, containing 300 g of dry rubber) were added distilled water (440 g) and then the aqueous surfactant solution A-1 (60 g, containing 9 g of active ingredient), followed by slow stirring with a spatula for 2 minutes. Formic acid (88% by mass, 52.3 g) was slowly added to the mixture while stirring with a stirrer, and then aqueous hydrogen peroxide (93.5 g) was added through a tube pump over 3 hours. Since the latex initially had a temperature of 40° C. and, as the reaction proceeded, would have a temperature higher than 60° C., the reaction was allowed to proceed while cooling the surrounding environment, so that the temperature was controlled in the range of 60 to 65° C. Specimens were collected after 4 hours, 8 hours, and 24 hours from the addition of aqueous hydrogen peroxide. Then, rubber was coagulated with steam, neutralized with an aqueous sodium carbonate solution (2% by mass) for 16 hours, and dried. The degree of epoxidation of the rubber thus prepared was examined using NMR. As a result, the degree of epoxidation was found to be 12.5% after 4 hours, 18.5% after 8 hours, and 25.4% after 24 hours, which revealed that epoxidation was achieved but took a very long time. Moreover, as formic acid was contained in the coagulated rubber, it was not reusable. Also, the use of the surfactant increased the cost. Furthermore, since the rubber physical properties are deteriorated by the absorption of moisture caused by the surfactant remaining in the rubber, the rubber was required to be very carefully washed.

Comparative Example 1-2

To low ammonia natural rubber latex having a dry rubber content of 60% by mass (500 g, containing 300 g of dry rubber) were added distilled water (460 g) and then the aqueous surfactant solution A-1 (40 g, containing 6 g of active ingredient), followed by slow stirring with a spatula for 2 minutes. The resulting latex was fed at a rate of 10.0 g/min to mixer (size: 25 cc) through a tube pump (tube inner diameter: 4 mm) with a controlled feed rate. Simultaneously, the peracetic acid-containing liquid a-1 was fed to the mixer at a rate of 7.6 g/min. After sufficiently mixing them with a stirring blade in the mixer, the mixture was fed to a coagulation apparatus through a tube pump (tube inner diameter: 5 mm) controlled to feed the mixture at a rate of 17.6 g/min (850 mm/min). The mixture had a temperature of 25° C. during the mixing, and 55° C. during the feeding. The system was designed to allow almost no liquid to be stored in the mixer, and thus the liquid retention time in the mixer was almost zero. On the other hand, the retention time in the tube was 15 minutes. The coagulation apparatus was configured such that a predetermined amount of steam was vented up through the bottom while the mixture flowed down from the top along the walls. The latex was coagulated by steam while running down to the bottom, and then partially separated into rubber and serum. Specimens of the rubber discharged from the coagulation apparatus were collected every 10 minutes. The specimens were cooled with water, immersed in an aqueous sodium bicarbonate solution (1 to 3% by mass) for a day, and then washed with water again, and dried to a constant weight. The degree of epoxidation of the rubber thus prepared was examined using NMR.

As a result, the degree of epoxidation was found to be 25-1%, 25.3%, 25.1%, 25.4%, 25.4%, 25.7%, 25.3%, and 25.5%, which demonstrated that the degree of epoxidation was very stable. The reaction very rapidly proceeded, but overall cost was very high due to a very large material loss, the use of steam, which consumes a large amount of energy, and a great burden on neutralization and washing.

Comparative Example 1-3

A vulcanized rubber sheet was prepared in the same manner as in Example 1-1, except that TSR20 was used. The physical properties of the vulcanized rubber sheet were examined.

Comparative Example 1-1

Rubber was coagulated by adding sulfuric acid (2% by mass) to 3 kg of FL. The rubber formed a large mass having a diameter of approximately 20 cm. It was thus impossible to epoxidize the entire rubber, and thus the subsequent epoxidation process was abandoned.

TABLE 1

|  |  | Example 1-1 | Example 1-2 | Example 1-3 | Example 1-4 | Example 1-5 | Comparative Example 1-1 | Comparative Example 1-2 | Comparative Example 1-3 |
|---|---|---|---|---|---|---|---|---|---|
| Solid Rubber | Degree of epoxidation | 19.7% | 18.9% | 19.3% | 17.8% | 15.8% | 25.4% | 25.4% | 0% |
|  | Time required for epoxidation process | 10 min | 10 min | 10 min | 10 min | 5 h | 24 h | 15 min | — |
|  | Reuse of chemical agents | Possible | Possible | Possible | Possible | Possible | Impossible | Impossible | — |
|  | Conditions of rubber surface | Similar to ordinary natural rubber | Similar to ordinary natural rubber | Similar to ordinary natural rubber | Similar to ordinary natural rubber | Similar to ordinary natural rubber | Similar to ordinary natural rubber | Similar to ordinary natural rubber | Similar to ordinary natural rubber |
| Formulation (parts by mass) | Solid rubber prepared in Example 1-1 | 100 | — | — | — | — | — | — | — |
|  | Solid rubber prepared in Example 1-2 | — | 100 | — | — | — | — | — | — |
|  | Solid rubber prepared in Example 1-3 | — | — | 100 | — | — | — | — | — |
|  | Solid rubber prepared in Example 1-4 | — | — | — | 100 | — | — | — | — |
|  | Solid rubber prepared in Example 1-5 | — | — | — | — | 100 | — | — | — |
|  | Solid rubber prepared in Comparative Example 1-1 | — | — | — | — | — | 100 | — | — |
|  | Solid rubber prepared in Comparative Example 1-2 | — | — | — | — | — | — | 100 | — |
|  | Solid rubber prepared in Comparative Example 1-3 | — | — | — | — | — | — | — | 100 |
|  | Silica | 75 | 75 | 75 | 75 | 75 | 75 | 75 | 75 |
|  | Silane coupling agent | 6 | 6 | 6 | 6 | 6 | 6 | 6 | 6 |
|  | Oil | 25 | 25 | 25 | 25 | 25 | 25 | 25 | 25 |
|  | Zinc oxide | 3 | 3 | 3 | 3 | 3 | 3 | 3 | 3 |
|  | Stearic acid | 2 | 2 | 2 | 2 | 2 | 2 | 2 | 2 |
|  | Calcium stearate | 6 | 6 | 6 | 6 | 6 | 6 | 6 | 6 |
|  | Sulfur (containing 5% of oil) | 1.58 | 1.58 | 1.58 | 1.58 | 1.58 | 1.58 | 1.58 | 1.58 |
|  | Vulcanization accelerator TBBS | 1.5 | 1.5 | 1.5 | 1.5 | 1.5 | 1.5 | 1.5 | 1.5 |
|  | Vulcanization accelerator DPG | 0.6 | 0.6 | 0.6 | 0.6 | 0.6 | 0.6 | 0.6 | 0.6 |
| Evaluation | Dispersion of Silica | ++ | ++ | ++ | ++ | ++ | ++ | ++ | − |
|  | Rubber strength index | 107 | 108 | 105 | 104 | 99 | 100 | 100 | 90 |

As clearly shown in Table 1, according to the methods of the examples, the reaction proceeded much faster and the cost required for epoxidation was lower than in Comparative Example 1-1. Moreover, even in the case of using the rubber having a relatively low degree of epoxidation, characteristically, silica was dispersed at a level comparable to that in the methods of the comparative examples which needed a long time for the reaction and were very costly, and the rubber strength was also high. Furthermore, in the examples, uniformly epoxidized natural rubbers were obtained as in methods where rubber in latex form is epoxidized.

The chemical agents used in Examples 2-1 to 2-11 and Comparative Examples 2-1 to 2-4 are listed below.

Natural rubber latex: Low ammonia latex in which ammonia, a trace amount of zinc oxide, and tetrathiuram disulfide were added for imparting decay resistance and stability (dry rubber content: 60% by mass; ammonia content: 0.2% by mass)

Cup lump: Common cup lump collected in a northeastern area in Thailand for sale to TSR processing factories, which was subjected to a conventional TSR production process (solid rubber crushed with a cutter such as a slab cutter, prebreaker, or rotary cutter, washed with water, and finely cut into a size of approximately 1 to 3 mm with a creper and a shredder)

Surfactant: Polyoxyethylene fatty acid alcohol (the number of carbon atoms in the alcohol: 12 to 18, cloud point: 70 to 80° C.)

Acetic acid: Active ingredient content: 98% or 94%, Grade: extra pure

Formic acid: Active ingredient content: 88%, Grade: extra pure

Aqueous hydrogen peroxide: Active ingredient content: 50% or 30% (50% unless the concentration is specified)

Sulfuric acid: Active ingredient content: 98%

Sodium carbonate: Anhydrous sodium carbonate (purity: 99% or higher)

Silica: ULTRASIL VN3 produced by Degussa

Silane coupling agent: Si266 (bis(3-triethoxysilylpropyl)disulfide)

Zinc oxide: Zinc oxide #2 produced by Mitsui Mining & Smelting Co., Ltd.

Stearic acid: Stearic acid beads "Tsubaki" produced by NOF Corporation

Calcium stearate: Calcium stearate GF-200 produced by NOF Corporation

Oil: Palm oil olein

Sulfur: 5% oil-containing sulfur

Vulcanization accelerator TBBS: Nocceler NS produced by Ouchi Shinko Chemical Industrial Co., Ltd.

Vulcanization accelerator DPG: Nocceler D produced by Ouchi Shinko Chemical Industrial Co., Ltd.

Examples 2-1 to 2-11 and Comparative Examples
2-1 to 2-4

Production Example 2-1

Preparation of Peracetic Acid (Preparation of Peracetic Acid-Containing Liquid a-2)

A peracetic acid-containing liquid a-2 was prepared by mixing 243 g of acetic acid (98%), 270 g of aqueous hydrogen peroxide, and 4 g of sulfuric acid, and then allowing the mixture to stand at a temperature of 40° C. for 1 day. The amount of peracetic acid generated was determined by titration and found to be 60.4 g.

(Preparation of Peracetic Acid-Containing Liquid b-2)

A peracetic acid-containing liquid b-2 was prepared by adding 54 g of aqueous hydrogen peroxide to the rest of the peracetic acid-containing liquid a-2 used in Example 2-1 mentioned below, and then allowing the mixture to stand at a temperature of 40° C. for 1 day. The amount of peracetic acid generated was determined by titration and found by calculation to be 59 g in the entire liquid.

(Preparation of Peracetic Acid-Containing Liquid c-2)

A peracetic acid-containing liquid c-2 was prepared by adding 61 g of aqueous hydrogen peroxide to the rest of the peracetic acid-containing liquid b-2 used in Example 2-4 mentioned below, and then allowing the mixture to stand at a temperature of 40° C. for 1 day. The amount of peracetic acid generated was determined by titration and found by calculation to be 58 g in the entire liquid.

(Preparation of Peracetic Acid Liquid d-2)

A peracetic acid-containing liquid d-2 was prepared by mixing 500 g of acetic acid (94%), 887 g of aqueous hydrogen peroxide (30%), and 4 g of sulfuric acid, and then allowing the mixture to stand at a temperature of 40° C. for 1 day. The amount of peracetic acid generated was determined by titration and found to be 95.2 g. For use in Example 2-11, the liquid was prepared by using a 10-fold scale-up of all the amounts of chemical agents.

Production Example 2-2

Preparation of Aqueous Surfactant Solution

A 15% by mass aqueous surfactant solution was prepared by dissolving 150 g of polyoxyethylene fatty acid alcohol (the number of carbon atoms in the alcohol: 12 to 18, cloud point: 75° C.) in 850 g of ion exchange water.

Example 2-1

A cup lump having a moisture content of 29% (3 kg) was immersed in 517 g of the peracetic acid-containing liquid a-2 at a temperature of 30° C. for 5 minutes (during the immersion, the rubber was held in the liquid while being rotated to uniformly immerse the rubber). After pulling out from the liquid, the rubber was showered with tap water for 20 seconds. Then, the rubber was immersed in an aqueous sodium carbonate solution (2%) for 5 minutes, and again showered with tan water for 20 seconds. The resulting rubber was dried in an oven at a temperature of 90° C. for 4 hours to give an epoxidized natural rubber.

Example 2-2

An epoxidized natural rubber was prepared in the same manner as in Example 2-1, except that the amount of the peracetic acid-containing liquid a-2 was changed to 1034 g.

Example 2-3

An epoxidized natural rubber was prepared in the same manner as in Example 2-1, except that the amount of the peracetic acid-containing liquid a-2 was changed to 2067 g.

Example 2-4

An epoxidized natural rubber was prepared in the same manner as in Example 2-1, except that the peracetic acid-containing liquid b-2 was used instead of the peracetic acid-containing liquid a-2.

Example 2-5

An epoxidized natural rubber was prepared in the same manner as in Example 2-1, except that the peracetic acid-containing liquid c-2 was used instead of the peracetic acid-containing liquid a-2.

Example 2-6

A cup lump having a moisture content of 29% (30 kg) was immersed in 5.17 kg of the peracetic acid-containing liquid a-2 at a temperature of 30° C. for 5 minutes (during the immersion, the rubber was held in the liquid while being rotated to uniformly immerse the rubber). After the rubber was pulled out from the liquid, the rubber and 10.34 kg of the peracetic acid-containing liquid a-2 (one having a peracetic acid concentration of not less than 10% by mass, prepared separately from that used for the above immersion) were introduced in small portions to an extruder and extruded through an extrusion plate with holes to form thick noodles of rubber. The resulting rubber was showered with tap water for 20 seconds. Then, the rubber was immersed in an aqueous sodium carbonate solution (2%) for 5 minutes, and again showered with tap water for 20 seconds. The resulting rubber was dried in an oven at a temperature of 90° C. for 4 hours to give an epoxidized natural rubber.

Comparative Example 2-1

A rubber was prepared in the same manner as in Comparative Example 1-1.

Comparative Example 2-2

To low ammonia natural rubber latex having a dry rubber content of 60% by mass (500 g, containing 300 g of dry rubber) were added distilled water (460 g) and then a 15% by mass aqueous surfactant solution (40 g, containing 6 g of active ingredient), followed by slow stirring with a spatula for 2 minutes. The latex was fed at a rate of 10.0 g/min to a mixer (size: 25 cc) through a tube pump (tube inner diameter: 4 mm) with a controlled feed rate. Simultaneously, the peracetic acid-containing liquid a-2 was fed to the mixer at a rate of 7.6 g/min. After sufficiently mixing them with a stirring blade in the mixer, the mixture was fed to a coagulation apparatus through a tube pump (tube inner diameter: 5 mm) controlled to feed the mixture at a rate of 17.6 g/min (850 mm/min). The system was designed to allow almost no liquid to be stored in the mixer, and thus the liquid retention time in the mixer was almost zero. On the other hand, the retention time in the tube was 15 minutes. The coagulation apparatus was configured such that a predetermined amount of steam was vented up through the bottom while the mixture flowed down from the top along the walls. The latex was coagulated by steam while running down to the bottom, and then partially separated into rubber and serum. Specimens of the rubber discharged from the coagulation apparatus were collected every 10 minutes. The specimens were cooled with water, immersed in an aqueous sodium bicarbonate solution (1 to 3%) for a day, and then washed with water again, and dried to a constant weight. The degree of epoxidation of the rubber thus prepared was examined using NMR. As a result, the degree of epoxidation was found to be 25.1%, 25.3%, 25.1%, 25.4%, 25.4%, 25.7%, 25.3%, and 25.5%, which demonstrated that the degree of epoxidation was very stable. The reaction very rapidly proceeded, but overall cost was very high due to a very large material loss, the use of steam, which consumes a large amount of energy, and a great burden on neutralization and washing.

Comparative Example 2-3

To low ammonia natural rubber latex having a dry rubber content of 60% by mass (500 g, containing 300 g of dry rubber) were added distilled water (440 g) and then a 15% by mass aqueous surfactant solution (60 g, containing 9 g of active ingredient), followed by slow stirring with a spatula for 2 minutes. Acetic acid (98%, 9.18 g) was slowly added to the mixture while stirring with a stirrer, and then aqueous hydrogen peroxide (30%, 34 g) was added through a tube pump over 3 hours. Since the latex initially had a temperature of 40° C. and, as the reaction proceeded, might have a temperature higher than 60° C., the reaction was allowed to proceed while controlling the surrounding temperature in the range of 60 to 65° C. Specimens were collected after 4 hours, 8 hours, 20 hours, 24 hours, and 27 hours from the addition of aqueous hydrogen peroxide. Then, rubber was coagulated with steam, neutralized and dried. The degree of epoxidation of the rubber thus prepared was examined using NMR. As a result, the degree of epoxidation was found to be 1.5% after 4 hours, 3.2% after 8 hours, 4.6% after 20 hours, 4.9% after 24 hours, and 5.1% after 27 hours, which revealed that epoxidation proceeded gradually and surely, but took a very long time. Also, none of the chemical agents used was collectable. Moreover, the process was very long and costly as in Comparative Example 2.

Comparative Example 2-4

A vulcanized rubber sheet was prepared in the same manner as in Example 2-1, except that TSR20 was used. The physical properties of the vulcanized rubber sheet were examined.

TABLE 2

| | | Example 2-1 | Example 2-2 | Example 2-3 | Example 2-4 | Example 2-5 | Example 2-6 | Comparative Example 2-1 | Comparative Example 2-2 | Comparative Example 2-3 | Comparative Example 2-4 |
|---|---|---|---|---|---|---|---|---|---|---|---|
| Solid Rubber | Degree of epoxidation | 2.5% | 4.9% | 7.4% | 2.5% | 2.4% | 13.9% | 25.4% | 25.4 | 4.90% | 0.0% |
| | Time required for epoxidation process | 5 min | 5 min | 5 min | 5 min | 5 min | 15 min | 24 h | 15 min | 24 h | — |
| | Chemical agents (¥/kg) | 22.7 | 45.3 | 90.6 | 2.3 | 2.6 | 68.0 | 96.8 | 111.0 | 18.7 | — |
| | Labor time (personnel, hour) | 0.12 | 0.12 | 0.12 | 0.12 | 0.12 | 0.6 | 24 | 2 | 24 | — |
| | Labor cost (¥800/(personnel, hour)) | 96 | 96 | 96 | 96 | 96 | 480 | 19200 | 1600 | 19200 | — |
| | Chemical costs + Labor cost | 118.7 | 141.3 | 186.6 | 98.3 | 98.6 | 548.0 | 19296.8 | 1711.0 | 19218.7 | — |
| Formulation (parts by mass) | Solid rubber prepared in Example 2-1 | 100 | — | — | — | — | — | — | — | — | — |
| | Solid rubber prepared in Example 2-2 | — | 100 | — | — | — | — | — | — | — | — |
| | Solid rubber prepared in Example 2-3 | — | — | 100 | — | — | — | — | — | — | — |
| | Solid rubber prepared in Example 2-4 | — | — | — | 100 | — | — | — | — | — | — |
| | Solid rubber prepared in Example 2-5 | — | — | — | — | 100 | — | — | — | — | — |
| | Solid rubber prepared in Example 2-6 | — | — | — | — | — | 100 | — | — | — | — |
| | Solid rubber prepared in Comparative Example 2-1 | — | — | — | — | — | — | 100 | — | — | — |
| | Solid rubber prepared in Comparative Example 2-2 | — | — | — | — | — | — | — | 100 | — | — |

TABLE 2-continued

|  | | Example 2-1 | Example 2-2 | Example 2-3 | Example 2-4 | Example 2-5 | Example 2-6 | Comparative Example 2-1 | Comparative Example 2-2 | Comparative Example 2-3 | Comparative Example 2-4 |
|---|---|---|---|---|---|---|---|---|---|---|---|
|  | Solid rubber prepared in Comparative Example 2-3 | — | — | — | — | — | — | — | — | 100 | — |
|  | Solid rubber prepared in Comparative Example 2-4 | — | — | — | — | — | — | — | — | — | 100 |
|  | Silica | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 |
|  | Oil | 25 | 25 | 25 | 25 | 25 | 25 | 25 | 25 | 25 | 25 |
|  | Zinc oxide | 3 | 3 | 3 | 3 | 3 | 3 | 3 | 3 | 3 | 3 |
|  | Stearic acid | 2 | 2 | 2 | 2 | 2 | 2 | 2 | 2 | 2 | 2 |
|  | Calcium stearate | 6 | 6 | 6 | 6 | 6 | 6 | 6 | 6 | 6 | 6 |
|  | Sulfur (containing 5% of oil) | 1.58 | 1.58 | 1.58 | 1.58 | 1.58 | 1.58 | 1.58 | 1.58 | 1.58 | 1.58 |
|  | Vulcanization accelerator TBBS | 1.5 | 1.5 | 1.5 | 1.5 | 1.5 | 1.5 | 1.5 | 1.5 | 1.5 | 1.5 |
|  | Vulcanization accelerator DPG | 0.6 | 0.6 | 0.6 | 0.6 | 0.6 | 0.6 | 0.6 | 0.6 | 0.6 | 0.6 |
| Evaluation | Dispersion of Silica | + | + | ++ | + | + | ++ | ++ | ++ | + | − |
|  | Rubber strength index | 96 | 99 | 100 | 96 | 97 | 105 | 100 | 101 | 95 | 90 |

As clearly shown in Table 2, according to the methods of the examples, the reaction proceeded very rapidly and the cost required for epoxidation was also low. Moreover, even in the case of using the rubber having a relatively low degree of epoxidation, characteristically, silica was dispersed at a level comparable to that in the methods of the comparative examples which needed a long time for the reaction and were very costly, and the rubber strength was also high.

Example 2-7

A container with a jacket was charged with 3 kg of an aqueous formic acid solution (88%), 3 kg of ion exchange water, and 5 g of sulfuric acid, and they were stirred. A cup lump having a moisture content of 29% (3 kg) was immersed in the mixture, and then heated so that the entire temperature reached 50° C. Then, 116 g of a hydrogen peroxide solution (30%) was dropwise added to the mixture over 3 hours, followed by reaction for 5 hours. After pulling out from the liquid, the resulting rubber was showered with tap water for 20 seconds. Then, the rubber was immersed in an aqueous sodium carbonate solution (2%) for 10 minutes, and again showered with tap water for 20 seconds, followed by drying. The drying was performed in an oven at a temperature of 90° C. for 4 hours to give an epoxidized natural rubber.

Example 2-8

An epoxidized natural rubber was prepared in the same manner as in Example 2-7, except that 197 g of hydrogen peroxide (30%) was used.

Example 2-9

An epoxidized natural rubber was prepared in the same manner as in Example 2-7, except that 394 g of hydrogen peroxide (30%) was used.

Example 2-10

An epoxidized natural rubber was prepared in the same manner as in Example 2-7, except that 789 g of hydrogen peroxide (30%) was used.

Example 2-11

A container with a jacket was charged with 3 kg of an aqueous formic acid solution (88%), 3 kg of ion exchange water, and 5 g of sulfuric acid, and they were stirred. A cup lump having a moisture content of 29% (3 kg) was immersed in the mixture, and then heated so that the entire temperature reached 50° C. Then, 394 g of a hydrogen peroxide solution (30%) was dropwise added to the mixture over 3 hours, followed by reaction for 5 hours. After the resulting rubber was pulled out from the liquid, the rubber and the peracetic acid-containing liquid d-2 were gradually introduced into an extruder and kneaded to cause epoxidation. The epoxidized rubber was extruded through a plate with holes attached in advance to the outlet of the extruder to form thick noodles of rubber. Then, the rubber was washed with water, immersed in an aqueous sodium carbonate solution (2%) for 2 hours, and again washed by spraying with water to remove the alkali. Subsequently, it was finely cut with a shredder, and dried at 90° C. for 4 hours to give an epoxidized natural rubber.

TABLE 3

|  |  | Example 2-7 | Example 2-8 | Example 2-9 | Example 2-10 | Example 2-11 |
|---|---|---|---|---|---|---|
| Solid Rubber | Degree of epoxidation | 3.0% | 4.9% | 9.8% | 16.0% | 20.5% |
|  | Time required for epoxidation process | 5 h | 5 h | 5 h | 5 h | 5 h |

TABLE 3-continued

|  |  | Example 2-7 | Example 2-8 | Example 2-9 | Example 2-10 | Example 2-11 |
|---|---|---|---|---|---|---|
|  | Chemical agents (¥/kg) | 26.9 | 30.9 | 40.7 | 60.5 | 164.6 |
|  | Labor time (personnel, hour) | 1 | 1 | 1 | 1 | 1.5 |
|  | Labor cost (¥800/ (personnel, hour)) | 800 | 800 | 800 | 800 | 1200 |
|  | Chemical costs + Labor cost | 827.9 | 831.9 | 841.7 | 861.5 | 1366.1 |
| Formulation (parts by mass) | Solid rubber prepared in Example 2-7 | 100 | — | — | — | — |
|  | Solid rubber prepared in Example 2-8 | — | 100 | — | — | — |
|  | Solid rubber prepared in Example 2-9 | — | — | 100 | — | — |
|  | Solid rubber prepared in Example 2-10 | — | — | — | 100 | — |
|  | Solid rubber prepared in Example 2-11 | — | — | — | — | 100 |
|  | Silica | 75 | 75 | 75 | 75 | 75 |
|  | Silane coupling agent | 6 | 6 | 6 | 6 | 6 |
|  | Oil | 25 | 25 | 25 | 25 | 25 |
|  | Zinc oxide | 3 | 3 | 3 | 3 | 3 |
|  | Stearic acid | 2 | 2 | 2 | 2 | 2 |
|  | Calcium stearate | 6 | 6 | 6 | 6 | 6 |
|  | Sulfur (containing 5% of oil) | 1.58 | 1.58 | 1.58 | 1.58 | 1.58 |
|  | Vulcanization accelerator TBBS | 1.5 | 1.5 | 1.5 | 1.5 | 1.5 |
|  | Vulcanization accelerator DPG | 0.6 | 0.6 | 0.6 | 0.6 | 0.6 |
| Evaluation | Dispersion of Silica | + | + | ++ | ++ | ++ |
|  | Rubber strength index | 100 | 102 | 104 | 105 | 103 |

As clearly shown in Table 3, the methods of Examples 2-7 to 2-11 also allowed epoxidation to be very easily achieved and enabled a reduction in the cost required for epoxidation. Moreover, similarly as above, even in the case of using the rubber having a relatively low degree of epoxidation, silica was highly dispersed, and the rubber strength was also excellent.

The invention claimed is:

1. A method for producing an epoxidized natural rubber, comprising:
   Step 1 of coagulating natural rubber latex into granules to prepare a granular solid rubber; and
   Step 2 of treating the granular solid rubber with an epoxidizing liquid to epoxidize the granular solid rubber.

2. The method for producing an epoxidized natural rubber according to claim 1,
   wherein the epoxidizing liquid is at least one of a peracetic acid-containing liquid and a performic acid-containing liquid.

3. The method for producing an epoxidized natural rubber according to claim 2,
   wherein the peracetic acid-containing liquid is obtained by mixing at least one of acetic acid and acetic anhydride with hydrogen peroxide and reacting them.

4. The method for producing an epoxidized natural rubber according to claim 2,
   wherein the performic acid-containing liquid is obtained by mixing formic acid with hydrogen peroxide and reacting them.

5. The method for producing an epoxidized natural rubber according to claim 1,
   wherein the natural rubber latex is at least one selected from the group consisting of field latex, concentrated latex obtained by concentrating field latex, and modified natural rubber latex obtained by removing non-rubber components from the foregoing.

6. The method for producing an epoxidized natural rubber according to claim 1,
   wherein Step 1 comprises coagulating the natural rubber latex into granules with the aid of an acid to prepare the granular solid rubber.

7. The method for producing an epoxidized natural rubber according to claim 1,
   wherein Step 1 comprises coagulating the natural rubber latex into granules with the aid of an acid and a flocculant to prepare the granular solid rubber.

8. The method for producing an epoxidized natural rubber according to claim 1,
   wherein the granular solid rubber has a particle size of not more than 20 mm.

9. The method for producing an epoxidized natural rubber according to claim 1,
   wherein the granular solid rubber has a particle size of not more than 12 mm.

10. The method for producing an epoxidized natural rubber according to claim 1,
    wherein the epoxidized natural rubber has a degree of epoxidation of 0.1 to 50%.

11. A method for producing a rubber composition for tires, comprising:
    coagulating natural rubber latex into granules to prepare a granular solid rubber;
    treating the granular solid rubber with an epoxidizing liquid to epoxidize the granular solid rubber; and
    kneading the epoxidized natural rubber.

12. A method for producing a pneumatic tire, said method comprising the steps of:
    coagulating natural rubber latex into granules to prepare a granular solid rubber;
    treating the granular solid rubber with an epoxidizing liquid to epoxidize the granular solid rubber; and
    kneading the epoxidized natural rubber.

* * * * *